United States Patent [19]
Sweet et al.

[11] Patent Number: 5,830,549
[45] Date of Patent: Nov. 3, 1998

[54] GLUE-DOWN PREFINISHED FLOORING PRODUCT

[75] Inventors: James C. Sweet, Troutman, N.C.; B. Shannon Fuller, Nashville, Tenn.

[73] Assignee: Triangle Pacific Corporation, Dallas, Tex.

[21] Appl. No.: 552,918

[22] Filed: Nov. 3, 1995

[51] Int. Cl.⁶ .................................................. B32B 3/00
[52] U.S. Cl. ........................ 428/40.1; 52/309.3; 52/388; 52/390; 428/40.5; 428/42.1; 428/42.2; 428/42.3; 428/43; 428/44; 428/50; 428/194
[58] Field of Search ................................ 428/40.1, 40.5, 428/41.7, 41.8, 42.1, 42.2, 42.3, 43, 44, 50, 352, 348, 347, 194, 192; 52/309.3, 388, 390

[56] References Cited

U.S. PATENT DOCUMENTS

| | | | |
|---|---|---|---|
| 1,394,120 | 10/1921 | Rockwell | 144/350 |
| 1,778,333 | 10/1930 | Neumann | 52/730.7 |
| 2,139,880 | 12/1938 | Colucci | 20/91 |
| 2,491,498 | 12/1949 | Kähr | 20/75 |
| 2,725,910 | 12/1955 | Kähr | 144/309 |
| 2,900,676 | 8/1959 | Kähr | 20/7 |
| 3,016,316 | 1/1962 | Olson | 154/45.9 |
| 3,287,203 | 11/1966 | Elmendorf | 428/50 |
| 3,345,244 | 10/1967 | Stolesen et al. | 161/116 |
| 3,579,941 | 5/1971 | Tibbals | 52/384 |
| 3,607,590 | 9/1971 | Califano | 428/77 |
| 3,615,975 | 10/1971 | Gillern et al. | 156/79 |
| 3,847,647 | 11/1974 | Bahlo | 117/38 |
| 3,888,061 | 6/1975 | Kahr | 52/589 |
| 4,041,200 | 8/1977 | Boranian et al. | 428/40 |
| 4,123,305 | 10/1978 | Krzeszowski | 156/71 |
| 4,259,470 | 3/1981 | Trotter et al. | 526/348 |
| 4,388,788 | 6/1983 | Bosco | 52/390 |
| 4,471,012 | 9/1984 | Maxwell | 428/106 |
| 4,695,502 | 9/1987 | Rush | 428/192 |
| 4,731,140 | 3/1988 | Yontrarak | 428/50 |
| 4,784,887 | 11/1988 | Abendroth | 428/54 |
| 4,906,497 | 3/1990 | Hellmann | 428/50 |
| 5,109,898 | 5/1992 | Schacht | 144/350 |
| 5,283,102 | 2/1994 | Sweet | 428/50 |
| 5,362,560 | 11/1994 | Ehrhart | 428/48 |

FOREIGN PATENT DOCUMENTS

| | | |
|---|---|---|
| 1198883 | 8/1984 | Argentina . |
| 1201246 | 3/1985 | Argentina . |
| 154091 | 7/1932 | Switzerland . |
| 328341 | 4/1958 | Switzerland . |

OTHER PUBLICATIONS

Wood & Wood Products, "Wood Tile Firm Improves Product With New Adhesive System," Oct. 1988, all pages.
Bruce Hardwood Floors, "How To Install," 1992, all pages.
Premier Wood Floors And The Wood Wizard Present, "Wood Magic," Jan. 15, 1995, pp. 11–15, 35–40, 47–48, 58–63, and 80–85.
Bruce Hardwood Floors, "Installers Handbook," 1994, pp. 6, 7, 56–58, and 62.

*Primary Examiner*—Nasser Ahmad
*Attorney, Agent, or Firm*—Adams Law Firm, P.A.

[57] ABSTRACT

A flooring product for application to a subfloor which includes a wooden flooring component for installation with like flooring components to form a floor. The flooring component has a top surface for being exposed after installation and a bottom surface, a layer of an adhesive applied and permanently adhered directly to the bottom surface of the flooring component for providing an attachment interface surface for adhering the flooring component to the subfloor, and a protective release cover applied and releasably adhered to the attachment interface surface of the adhesive to protect the adhesive until removal of the release cover when the flooring component is applied to the subfloor.

12 Claims, 6 Drawing Sheets

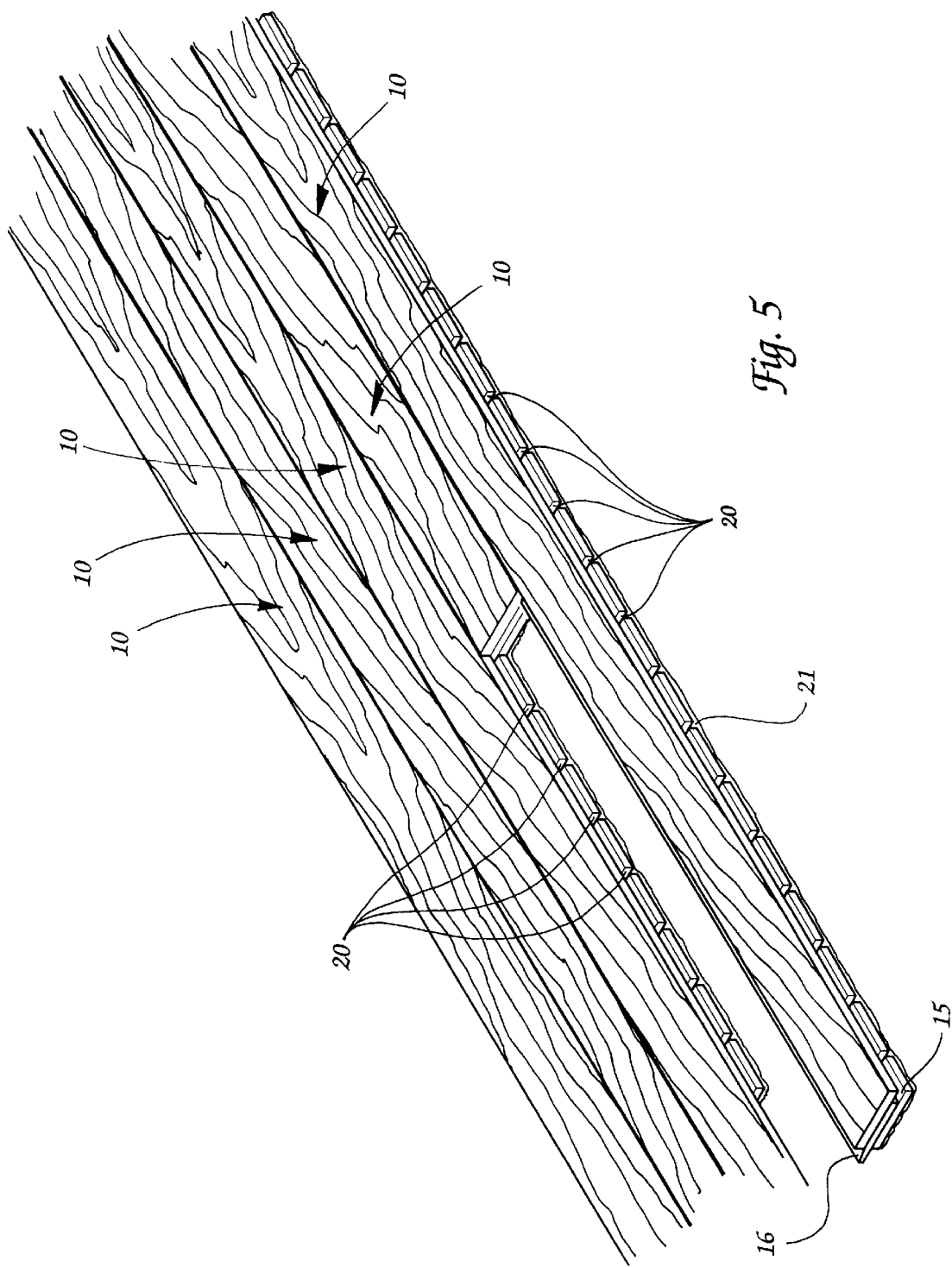

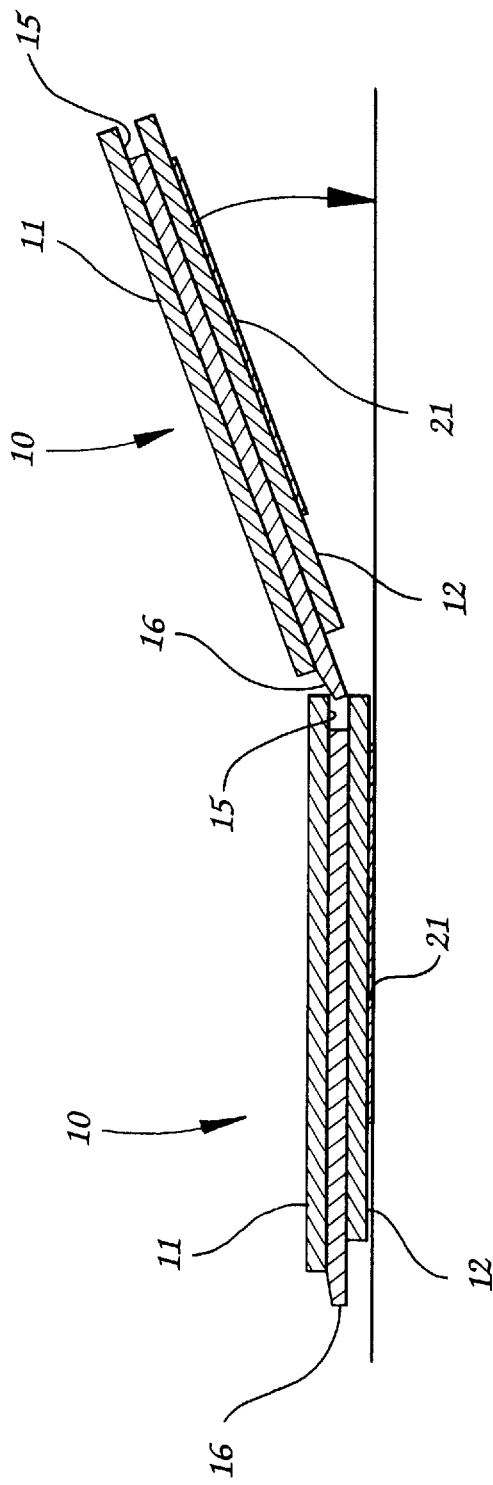

GLUE-DOWN PREFINISHED FLOORING PRODUCT

TECHNICAL FIELD AND BACKGROUND OF THE INVENTION

This invention relates to a glue-down prefinished wood flooring product, and a method of manufacturing such a product. Wooden flooring is typically installed by either nailing strips of adjacent wood flooring strips to a subfloor to form an essentially seamless wooden flooring surface, or by applying wood flooring strips to a subfloor which has been pre-coated with, for example, a mastic-type layer into which the flooring strips are embedded.

Also, in the past applicant marketed an adhesive-backed "peel and stick" parquet wood flooring. The parquet squares were five-sixteenths inch thick solid wood. Adhesive was applied to both sides of a relatively thick foam pad. One side of the foam pad was adhered to the back side of the wooden square, and the other side covered by a release paper until application. The parquet squares were adhered to the floor by peeling off the release paper and sticking the padded squares to the subfloor. However, over time the adhesive released from the subfloor. In addition, the relatively thick foam pad sheared, i.e., delaminated irregularly along a plane substantially parallel to the plane of the parquet squares, and caused failure of the floor. This product was removed from the market due to these failures.

There is a need in the market for a prefinished hardwood strip flooring product which can be adhered by an adhesive directly to a suitable subfloor, and which will serve with the same durability and longevity as other, more expensive wood flooring systems. This flooring product should preferably have the same solid "feel" as a full thickness, solid hardwood floor of the type typically nailed into place, without any of the "spring" or "bounce" which characterizes prior art glue-down flooring systems which rely on relatively thick foam adhesive pads to adhere the system to the subfloor.

The product according to the application is faster, easier and less expensive to install than either a nail-down flooring system or a flooring system laid into a pre-applied mastic layer. The product has particular application in the flooring aftermarket for use by "do-it-yourself" homeowners who want the expensive look of high quality hardwood flooring without the disruption resulting from a contractor-installed floor. There is presently a trend back towards the use of hardwood flooring, and many homeowners are removing existing carpeting in order to replace it with hardwood flooring. A flooring system which can be installed onto a subfloor onto which a carpet was previously installed without the need to raise doors and moldings to accommodate a greater thickness is desirable, since it simplifies the do-it-yourself installation process.

The flooring product and method according to this application address those needs.

SUMMARY OF THE INVENTION

Therefore, it is an object of the invention to provide a glue-down wood flooring system which can be installed easily by do-it-yourself installers.

It is another object of the invention to provide a glue-down wood flooring system which is as durable as conventional wood flooring systems, such as nail-down flooring systems.

It is another object of the invention to provide a glue-down wood flooring system which utilizes an adhesive which does not add significantly to the thickness of the flooring product.

It is another object of the invention to provide a glue-down wood flooring system which, after installation, is indistinguishable in appearance and serviceability from conventional wood flooring systems, such as nail-down flooring systems.

It is another object of the invention to provide a glue-down wood flooring system which is sufficiently low profile so that it can be installed on subfloors where carpet was previously installed without raising the doors and moldings.

It is another object of the invention to provide a glue-down wood flooring system which can be installed over a wide variety of subfloors without extensive preparation.

It is another object of the invention to provide a glue-down wood flooring system which is aggressively bonded to the subfloor.

These and other objects of the present invention are achieved in the preferred embodiments disclosed below by providing a flooring product for application to a subfloor; comprising a wooden flooring component for installation with like flooring components to form a floor, said flooring component having a top surface for being exposed after installation, an opposed bottom surface, two opposed end edges and two opposed side edges. A layer of adhesive is applied and permanently adhered directly to the bottom surface of the wooden flooring component in spaced-apart relation to at least one of the opposed side edges for providing an attachment interface surface for adhering the flooring component to the subfloor. A protective release cover is releasably adhered to the attachment interface surface of the adhesive to protect the adhesive until removal of the release cover when the flooring component is applied to the subfloor.

According to one preferred embodiment of the invention, the adhesive comprises a unitary layer of hot melt adhesive.

According to another preferred embodiment of the invention, said adhesive has a thickness no greater than 10% of the thickness of the wooden flooring component to which it is applied.

According to another preferred embodiment of the invention, said adhesive comprises a non-foam adhesive.

According to yet another preferred embodiment of the invention, said adhesive comprises an adhesive having a shear strength within the range of 13 psi to 21 psi at 60% relative humidity at 72° F.

According to yet another preferred embodiment of the invention, said flooring product includes a multiplicity of scores extending laterally across the flooring strip from one side edge to the other side edge.

Preferably, the hot melt adhesive has a melting temperature of approximately 200° F., and a melt viscosity of 15,000 Brookfield +\-1,000.

According to another preferred embodiment of the invention, the release cover comprises a paper sheet having a release wax on one side thereof.

According to yet another preferred embodiment of the invention, the top surface includes a protective wear finish.

According to yet another preferred embodiment of the invention, the flooring component is selected from the group consisting of solid wood strip, laminated wood strip, solid parquet block and laminated parquet block.

According to yet another preferred embodiment of the invention, the adhesive layer is positioned on the bottom surface of the flooring strip in spaced-apart relation to both side edges for providing an attachment interface surface for adhering the flooring component to the subfloor while permitting interconnection of the flooring strip with an adjacent, like flooring strip without contact of the adhesive with the subfloor.

An embodiment of the method according to the invention comprises a method of making a flooring product for application to a subfloor, and comprising the steps of providing a wooden flooring component for installation with like flooring components to form a floor, said flooring component having a top surface for being exposed after installation, a bottom surface and opposed side edges, and applying and permanently adhering an adhesive layer directly to the bottom surface of the flooring component for providing an attachment interface surface for adhering the flooring component to the subfloor. A marginal area adjacent at least one of the opposing side edges on the bottom surface of the flooring component is left devoid of adhesive. A protective release cover is applied and releasably adhered to the attachment interface surface of the adhesive to protect the adhesive until removal of the release cover when the flooring component is applied to the subfloor.

Preferably, the step of applying the adhesive comprises applying a hot melt adhesive.

According to one preferred embodiment of the invention, the step of applying said hot melt adhesive comprises the step of applying a hot melt adhesive having a melting temperature of approximately 200° F., and a melt viscosity of 15,000 Brookfield +\-1,000.

According to yet another preferred embodiment of the invention, the step of applying the release cover comprises the step of applying a paper sheet having a release wax on one side thereof to the adhesive.

According to yet another preferred embodiment of the invention, the method includes the step of applying a protective wear finish to the top surface of the flooring component.

According to yet another preferred embodiment of the invention, the method includes the step of selecting said flooring component from the group consisting of solid wood strip, laminated wood strip, solid parquet block and laminated parquet block.

Preferably, the adhesive is applied to the release cover before the adhesive is applied to the bottom surface of the flooring component.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 5 is a perspective view of a section of laid flooring utilizing the flooring strips according to the present invention; and FIG. 6 is a side elevation illustrating a technique useful in installing flooring strips according to the present invention;

DESCRIPTION OF THE PREFERRED EMBODIMENT AND BEST MODE

General Description

Figure 1:
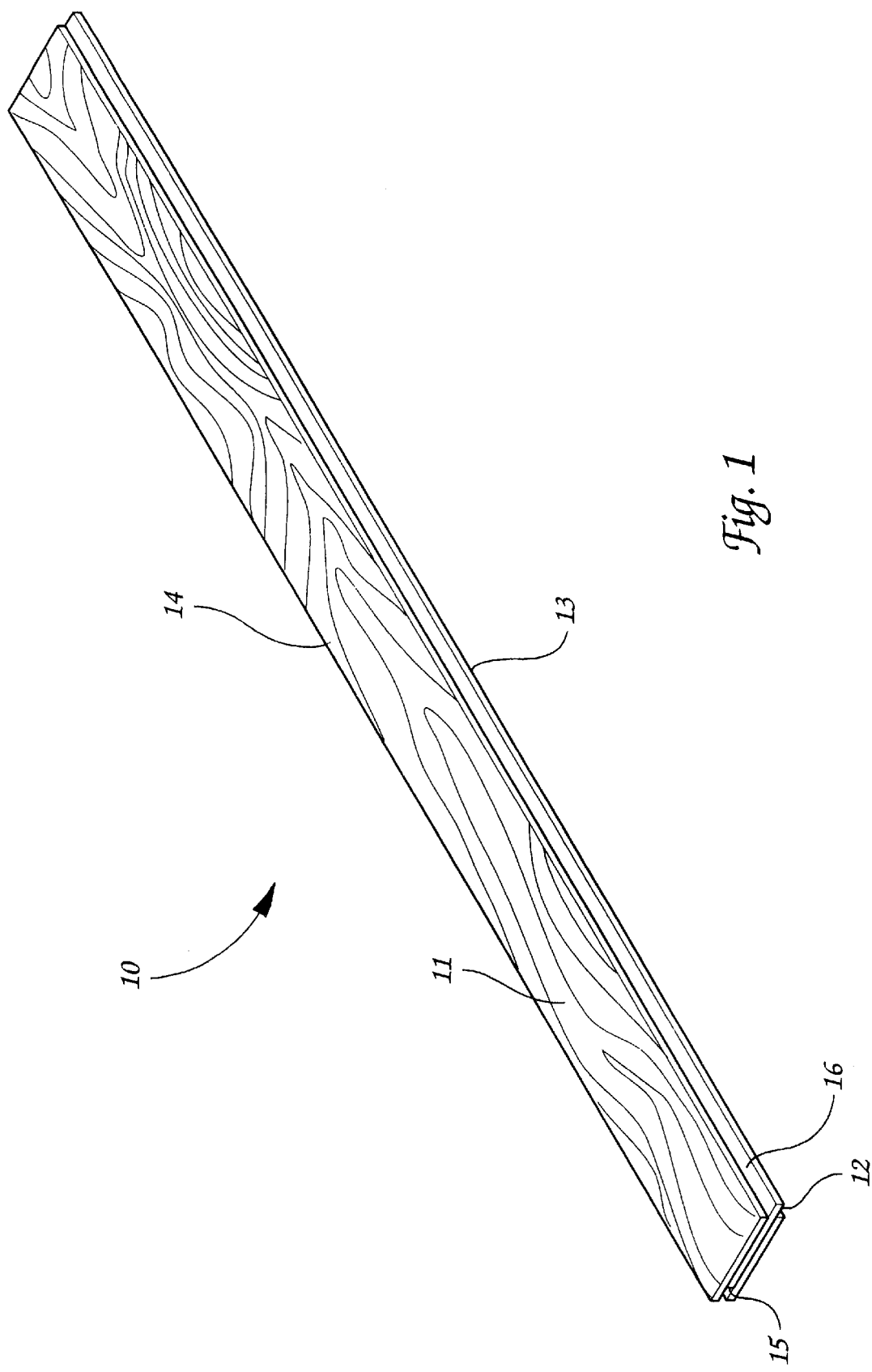
FIG. 1 is a perspective view of the finished side of a flooring strip according to a preferred embodiment of the present invention.

Referring now specifically to the drawings, a wooden flooring strip according to the present invention is illustrated in FIG. 1 and shown generally at reference numeral 10. Flooring strip 10 may be any suitable length, width and thickness, but typical sizes and constructions are 1/4th, 3/8ths and 15/16ths-inch thick laminated or solid oak flooring strips between 2 and 1/4th and 8 inches wide and up to 5 feet long, or as parquet blocks.

Flooring strip 10 has a top surface 11, which may be finished or unfinished, an opposite bottom surface 12, and opposed side edges 13 and 14. The flooring strip 10 includes a groove 15 which extends along side edge 14 and a mating tongue 16 which extends along the opposite side edge 13. Grooves 15 and tongues 16 of adjacent flooring strips mate to form a substantially seamless floor.

Figure 2:
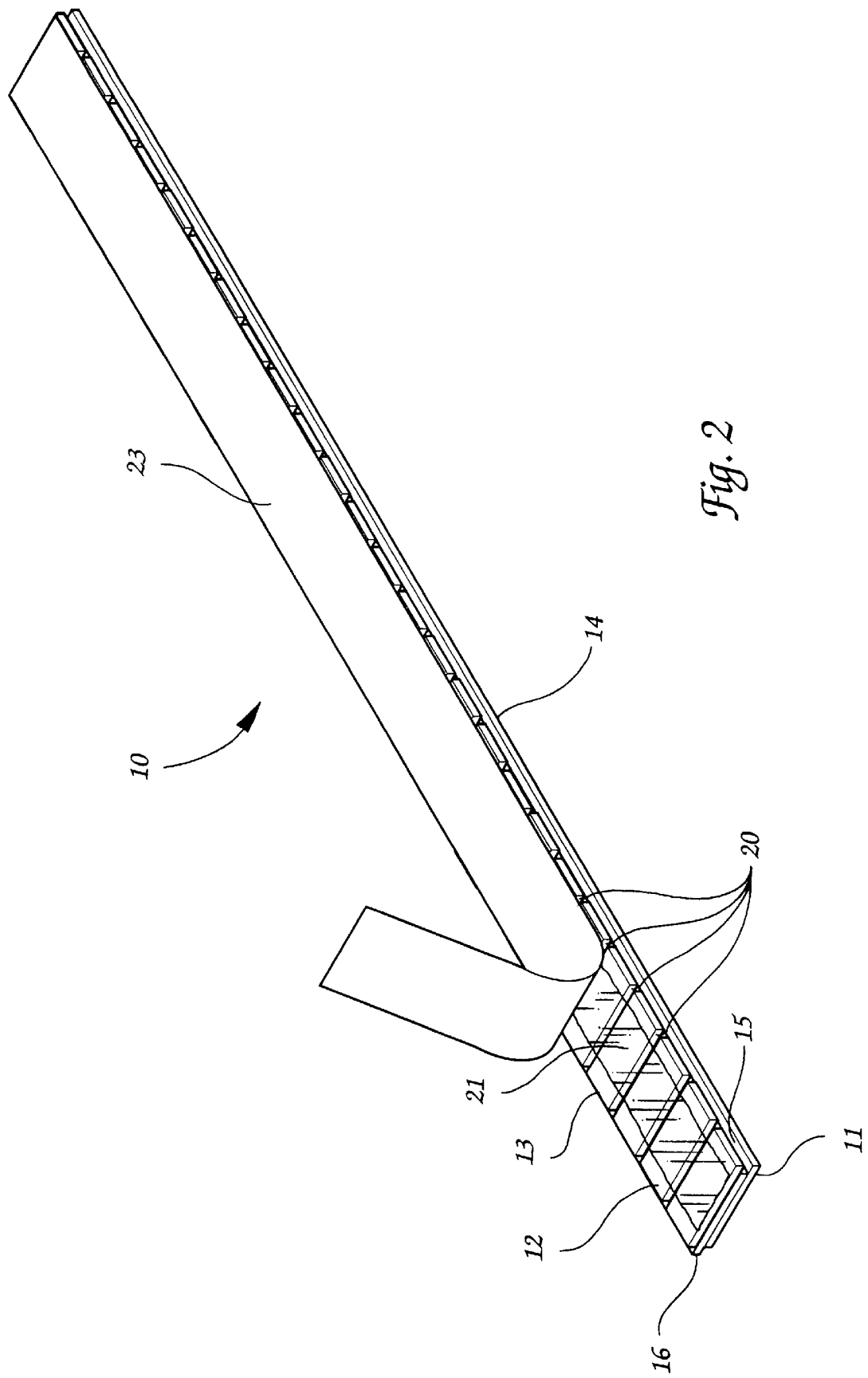
FIG. 2 is a perspective view of the unfinished, adhesive-coated side of the flooring strip shown in FIG. 1, with the adhesive covered with a release paper.
Figure 3:
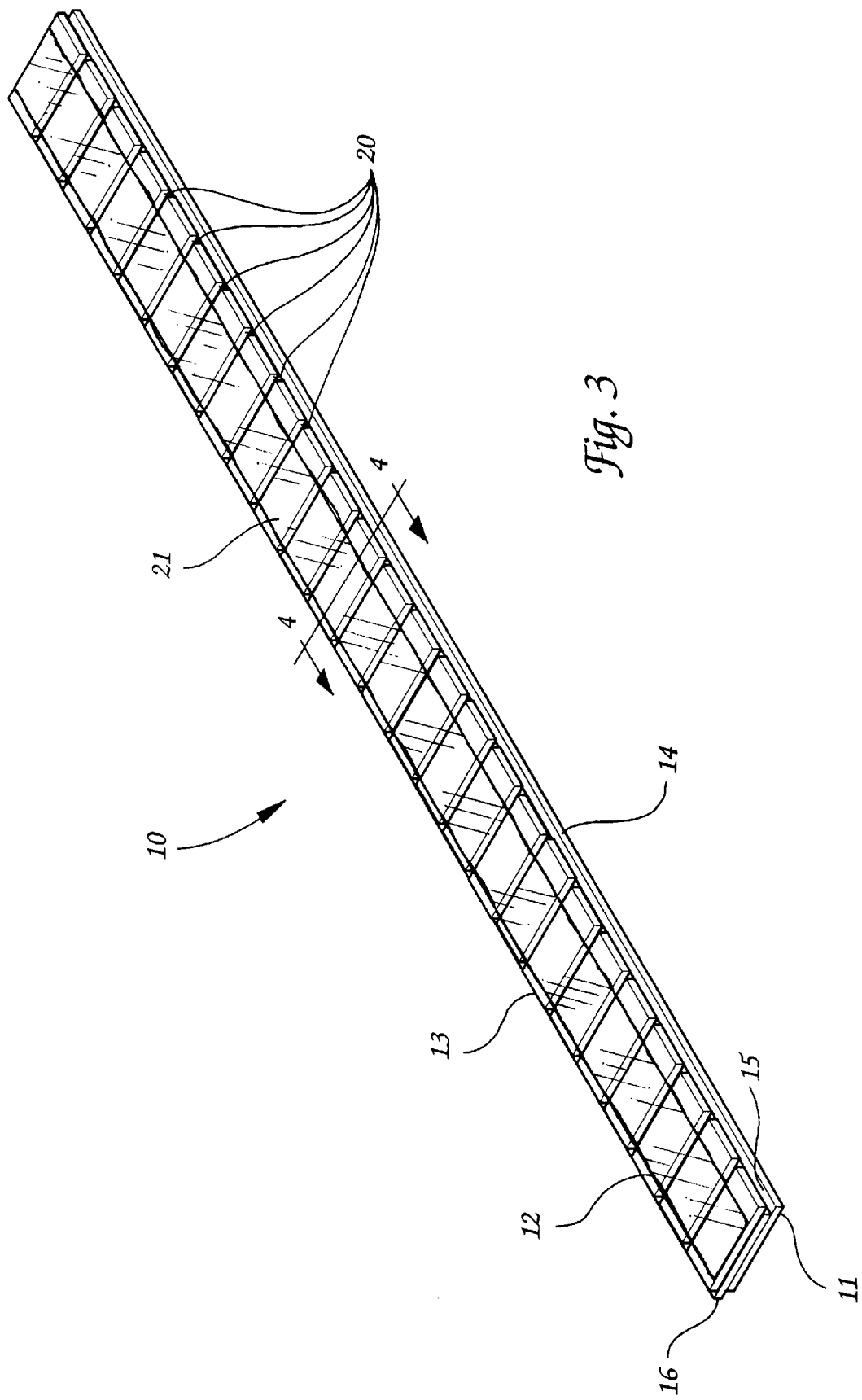
FIG. 3 is a perspective view of the unfinished, adhesive-coated side of the flooring strip shown in FIG. 1, with the release paper removed and the adhesive exposed for application.

As is shown in FIGS. 2 and 3, the bottom surface 12 is provided with transverse scores 20. The scores 20 extend from side to side in closely spaced-apart relation transverse to the length of the flooring strip 10 along substantially the entire length of the of the flooring strip 10, substantially as disclosed in applicant's U.S. Pat. No. 5,283,102. In accordance with a preferred embodiment of the invention, the scores 20 are 1/8th inch wide, 1/8th inch deep, and are spaced apart one inch on center. Other widths, depths and spacings are also possible.

The bottom surface 12 of flooring strip 10 is coated with a hot melt adhesive 21. Preferably, the adhesive 21 is applied in a single lengthwise-extending length from one end of the flooring strip 10 to the other. According to one preferred method, the adhesive 21 is supplied in a long, continuous strip on a roll of coiled release paper 23, wherein the adhesive 21 is sandwiched between adjacent layers of the coiled release paper 23. The adhesive 21 is removed from one side of the release paper 23 as the adhesive 21 is being applied to the flooring strip 10, with the exposed adhesive, still attached to the release paper 23, being pressed onto the bare wood of bottom surface 12. The sheet of release paper 23 remains adhered to the other side of the adhesive layer 21 and protects the adhesive 21 until the flooring strip 10 is ready to be applied to the subfloor.

Other methods of application are also possible, including direct application of the adhesive from an applicator onto the flooring strip, followed by application of a protective release paper.

The adhesive 21 is preferably spaced from both side edges 13 and 14 of the flooring strip 10, leaving bare wood on both side edges.

Figure 4:
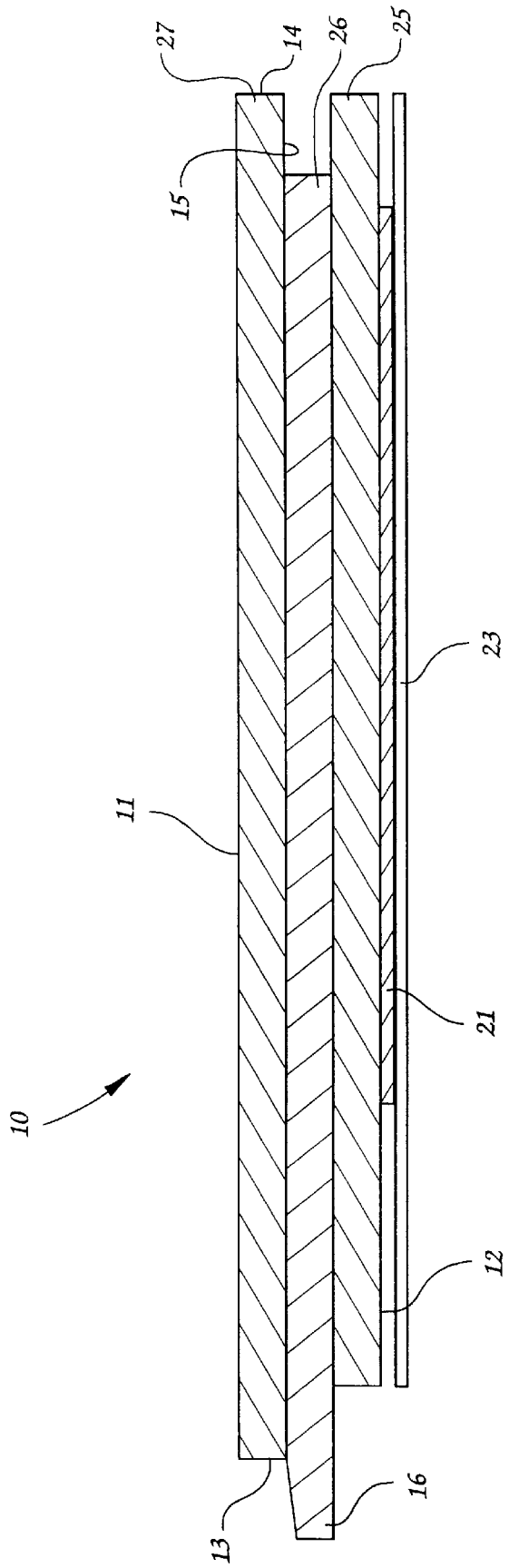
FIG. 4 is an enlarged cross-section taken along lines 4—4 of FIG. 3.

As is shown in FIG. 4, the flooring strip 10 according to one preferred embodiment of the invention is a laminate structure having three wood layers, 25, 26, 27, bonded together under heat and pressure, with the adhesive 21 being applied directly to the exposed wooden surface of the bottom layer 25 and covered with the release paper 23. According to one embodiment of the invention, the top layer 27 is a thin veneer layer of solid, unblemished, high quality wood, such as oak, while the middle and bottom layers 26 and 25 are either blemished strips of the same type of wood, or a less expensive type of wood. In embodiments wherein blemished wood is used on the bottom layer 25, the release paper 23 provides a cosmetic covering over the blemishes until application of the flooring strip 10 to the subfloor.

As is shown in FIG. 5, installation of the flooring strip 10 as described more specifically below creates a finished hardwood floor indistinguishable from other floors which are more expensive and difficult to install.

Detailed description of Adhesive

The preferred adhesive 21 is a hot melt, pressure sensitive adhesive manufactured by Capitol Adhesives. The Material Safety Data Sheet describes the product as thermoplastic material with a melting point of 208 degrees F. The adhesive 21 itself is a petroleum-based process oil with rubber and hydrocarbon resins. Its melt viscosity is 15,000 CPS Brookfield +/−1,000. The adhesive 21 is characterized by the fact that it remains tacky even at a high temperature.

The adhesive 21 is extremely robust, and even a short time after application, the adhesive 21 is sufficiently tenacious that trying to remove the flooring strip 10 by pulling up one end results in the flooring strip 10 splintering and breaking before the adhesive 21 releases.

The strength of the adhesive is demonstrated by the following test results:

Shear Strength

Testing samples were composed of two planks six (6) inches in length by three (3) inches in width placed together so that a 3" by 3" area is bonded together using pressure sensitive tape.

Before testing, the samples were placed in a press and submitted to a pressure of 100 p.s.i.

Two different sets of samples were tested. One set remained in normal room conditions (72 degrss F. 60% R.H.) during the testing period (30 days). The other set was placed in a high humidity environment (95% R.H.) during the testing period.

| 72 degrss F. 60% R.H. | | 75 degrss F. 95% R.H. | |
|---|---|---|---|
| Force (shear) | (p.s.i.) | Force (shear) | (p.s.i.) |
| Testing after 24 hours.: | | | |
| 124 | 13.78 | 181 | 20.11 |
| 85 | 9.44 | 177 | 19.67 |
| 163 | 18.11 | 161 | 17.89 |
| 135 | 15.00 | 156 | 17.33 |
| 177 | 19.67 | 169 | 18.78 |
| Avg. 136.8 | Avg. 15.20 | Avg. 168.8 | Avg. 18.76 |
| Testing after 15 days (360 hours): | | | |
| 153 | 17.00 | 185 | 20.56 |
| 191 | 21.22 | 137 | 15.22 |
| 126 | 14.00 | 185 | 20.56 |
| 140 | 15.56 | 175 | 19.44 |
| 168 | 18.67 | 185 | 20.56 |
| Avg. 155.6 | Avg. 17.29 | Avg. 173.4 | Avg. 19.27 |
| Testing after 30 days (720 hours): | | | |
| 120 | 13.33 | 193 | 21.44 |
| 190 | 21.11 | 202 | 22.44 |
| 214 | 23.78 | 206 | 22.89 |
| 197 | 21.89 | 205 | 22.78 |
| 234 | 26.00 | 201 | 22.33 |
| Avg. 191 | Avg. 21.22 | Avg. 201.4 | Avg. 22.38 |

Identation

Samples were tested for resistance to impact by the Gardner Identation method.

| Sample I.D. | 5 | 10 | 15 | 20 | 30 | 40 | 50 |
|---|---|---|---|---|---|---|---|
| 1 | 0.0077 | 0.0102 | 0.0141 | 0.0178 | 0.0165 | 0.0235 | 0.036 |
| 2 | 0.0058 | 0.0099 | 0.012 | 0.0143 | 0.0145 | 0.0215 | 0.0293 |
| 3 | 0.0048 | 0.009 | 0.0115 | 0.0135 | 0.0147 | 0.0205 | 0.0274 |
| 4 | 0.0064 | 0.012 | 0.0126 | 0.0176 | 0.023 | 0.0239 | 0.0338 |
| 5 | 0.0037 | 0.0071 | 0.0109 | 0.0155 | 0.0134 | 0.0216 | 0.025 |
| AVG. | 0.0057 | 0.0096 | 0.0122 | 0.0157 | 0.0164 | 0.0222 | 0.0303 |

As a preferred example, for a flooring strip 10 having a three inch wide top surface 11 and a 2⅞ inch wide bottom surface 12, the adhesive 21 is preferably applied with a ¼ inch margin between the one edge of the adhesive 21 and the side edge 14, and a ⅝ inch margin between the opposing side edge 13. Thus, the adhesive 21 is applied in this preferred embodiment in a two inch-wide band down the length of the flooring strip 10.

The adhesive 21 is applied at a rate of approximately 0.06 lbs. sq.ft. The adhesive 21 has a nominal thickness when applied to the flooring strip 10 of approximately 1/32 inch. When applied to a ⅜ inch flooring strip 10, it is therefore applied at a rate which results in a thickness which is approximately 10% of the thickness of the flooring strip 10. This percentage will vary with thicker flooring strips, but should not exceed 10%. This percentage of added thickness is imperceptible after installation, since the adhesive 21 is dense, relatively noncompressible and thus eliminates springiness associated with prior art glue-down products.

The relative thinness of the adhesive in relation to the thickness of the flooring strip 10 provides stability to the flooring strip 10 and completely eliminates shearing of the adhesive. It is also important to emphasize that the adhesive is non-foamed. In other words, the adhesive is not mechanically agitated or chemically treated to create trapped air or other gases in the adhesive matrix. Rather, the adhesive 21 is a non-porous, non-foamed, extremely viscous material. If any air bubbles are present in the adhesive layer 21, they are incidental to and the result of handling.

Subfloor

Flooring strip 10 may be applied to a number of different subfloor constructions, such as plywood, oriented strand board or 40 pound particle board. The floor can also be installed over existing floors. If the existing floor is a wood floor, all wax must be removed, since the adhesive is designed not to stick to waxed surfaces—hence the use of a wax-coated release paper. Polyurethane-finished floors need not be stripped as long as the finish is well bonded. Vinyl-type flooring can be used so long as the wear layer is intact and has a PVC or Polyurethane wear layer. The floor can be installed over a concrete subfloor if clean and dust-free. This condition can be achieved by carefully sweeping or vacuuming the floor, and then cleaning it with solvent or alcohol cleaner.

Plaster dust and similar materials prevent the adhesive from adhering to the subfloor, so cleaning to remove these and similar materials is very important.

Installation Method

A chalk line, framing square, a roller, such as a hardwood flooring roller, 80–150 pound vinyl roller, small hand-held roller or rolling pin, and a miter saw are usually the only tools needed for installation.

A 5% cutting allowance is usually sufficient. The subfloor should be checked for damage, levelness and cleanliness, and corrected if necessary.

First, the installer finds starting point depending on pattern and chalk line in a conventional manner. A "dry" fit of the flooring strip 10 is made to determine necessary cuts. The ends are measured before removing the release paper 23, the ends are dry fitted, then cut, then the release paper 23 is removed to expose the adhesive and the flooring strip 10 is carefully pressed onto the subfloor. The flooring strip 10 is applied to the subfloor along a chalk line, with the groove 15 on the chalk line, and the tongue 16 away from the installer. Other cuts around heat registers, pipes and the like are made as the flooring strips 10 are installed, and before removal of the release paper 23, as described above.

Referring to FIG. 6, the manner of installation of individual flooring strips 10 is shown. As noted above, marginal areas of the bottom surface of the flooring strips 10 are not covered with adhesive 21. Flooring strips 10 are installed with the tongue 16 facing away from the installer. Release paper 23 is removed and the tongue 16 of the flooring strip 10 is introduced into the groove 15 of the adjacent flooring strip 10 at an angle, as shown in FIG. 6. The absence of adhesive 21 on the marginal area of the bottom surface 12 adjacent the tongue 16 permits placement of the flooring strip 10 very closely adjacent to the just-laid flooring strip 10 without the adhesive 21 contacting the subfloor. The tongue 16 can therefore be inserted completely into the adjacent groove 15 and the flooring strip 10 pressed firmly onto the subfloor in a single motion. The adhesive 21 is sufficiently tenacious that the flooring strip should be very substantially in its final position before being pressed to the subfloor. If needed, the flooring strip 10 can be tapped, taking care not to damage the top surface edges, in order to position it seamlessly next to its adjacent flooring strip 10. In addition, the absence of a tongue and groove on the opposing end edges of the flooring strips 10 eliminates the need to slide the flooring strip 10 laterally after placement on the subfloor, which would be necessary if the ends had tongues and grooves.

Shoe molding, radiator pipe flanges and heat register covers are reinstalled. The entire floor is rolled after installation of the flooring strips 10, and the installation is complete.

A flooring glue-down prefinished wood flooring product and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A flooring product for application to a subfloor; comprising:
    (a) a wooden flooring component for installation with like flooring components to form an assembled wood floor, said flooring component having a top surface for being exposed after installation, an opposed bottom surface, two opposed end edges and two opposed side edges;
    (b) an adhesive layer applied and permanently adhered directly to the bottom surface of the wooden flooring component and extending from one end edge of the flooring component to the opposite end edge of the flooring component for providing an attachment interface surface for adhering the flooring component to the subfloor;
    (c) said adhesive layer extending along the entire length of said flooring component and spaced-apart from at least one of the opposed side edges of the flooring component to define an adhesive-free zone for providing clearance between said at least one side edge of the flooring component and the subfloor during installation;
    (d) a protective release cover applied and releasably adhered to the attachment interface surface of the adhesive to protect the adhesive until removal of the release cover when the flooring component is applied to the subfloor;
    (e) locking means extending along the length of said flooring component adjacent each of the opposed side edges for locking adjacent flooring components together side-to-side to form the wood floor, said locking means comprising a tongue formed on one side edge of the flooring component and a mating groove on the other side edge of the flooring component, each of said tongue and said groove being adapted for mating connection with complementary elements on adjacent flooring components; and
    (f) the bottom surface of said flooring component having a plurality of longitudinally-spaced scores cut therein transverse to the length of said flooring component, extending from one side edge to the other side edge, and along substantially the entire length of said flooring component for more closely adhering to irregularities of the subfloor.

2. A flooring product according to claim 1, wherein said adhesive layer comprises a unitary layer of adhesive applied to the flooring component while heated to a melted condition and thereafter retaining its adhesion capability to attachment to the subfloor without any further heating before, during or after installation.

3. A flooring product according to claim 1 or 2, wherein said adhesive layer has a thickness no greater than 10% of the thickness of the wooden flooring component to which it is applied.

4. A flooring product according to claim 1 or 2, wherein said adhesive comprises a non-foam adhesive.

5. A flooring product according to claim 1 or 2, wherein said adhesive comprises an adhesive having a shear strength within the range of 13 psi to 21 psi at 60% relative humidity at 72° F.

6. A flooring product according to claim 2, wherein said hot melt adhesive has a melting temperature of approximately 200° F., and a melt viscosity of 15,000 Brookfield +\−1,000.

7. A flooring product according to claim 1, wherein said release cover comprises a paper sheet having a release wax on at least one side thereof.

8. A flooring product according to claim 1, wherein said top surface includes a protective wear finish.

9. A flooring product according to claim 1, wherein said flooring component is selected from the group consisting of solid wood strip, laminated wood strip, solid parquet block or laminated parquet block.

10. A flooring product according to claim 1, wherein said adhesive-free zone has a width less than 25% of the total distance between the two opposed side edges of the flooring component.

11. A flooring product for application to a subfloor; comprising:
   (a) a wooden flooring component for installation with like flooring components to form an assembled wood floor, said flooring component having a top surface for being exposed after installation, an opposed bottom surface, two opposed end edges and two opposed side edges;
   (b) an adhesive layer applied and permanently adhered directly to the bottom surface of the wooden flooring component and extending from one end edge of the flooring component to the opposite end edge of the flooring component for providing an attachment interface surface for adhering the flooring component to the subfloor;
   (c) said adhesive layer extending along the entire length of said flooring component and spaced-apart from respective ones of said two opposed side edges of the flooring component to define laterally-spaced adhesive-free zones for providing clearance between one or the other of said two side edges of the flooring component and the subfloor during installation;
   (d) a protective release cover applied and releasably adhered to the attachment interface surface of the adhesive to protect the adhesive until removal of the release cover when the flooring component is applied to the subfloor;
   (e) locking means extending along the length of said flooring component adjacent each of the opposed side edges for locking adjacent flooring components together side-to-side to form the wood floor, said locking means comprising a tongue formed on one side edge of the flooring component and a mating groove on the other side edge of the flooring component, each of said tongue and said groove being adapted for mating connection with complementary elements on adjacent flooring components; and
   (f) the bottom surface of said flooring component having a plurality of longitudinally-spaced scores cut therein transverse to the length of said flooring component, extending from one side edge to the other side edge, and along substantially the entire length of said flooring component for more closely adhering to irregularities of the subfloor.

12. A flooring product according to claim 11, wherein said first and second adhesive-free zones each have a width less than 25% of the total distance between the two opposed side edges of the flooring component.

* * * * *